US009957984B2

(12) United States Patent
Lucchi et al.

(10) Patent No.: US 9,957,984 B2
(45) Date of Patent: May 1, 2018

(54) METHOD FOR MAKING A DETECTION DEVICE FOR DETECTING THE POSITION OF A MOVABLE ROD OF A PNEUMATIC ACTUATOR AND DETECTION DEVICE OBTAINABLE WITH THAT METHOD

(71) Applicant: FAIST COMPONENTI S.P.A., Montone (IT)

(72) Inventors: Elena Lucchi, Umbertide (IT); Stefano Benicchi, Perugia (IT)

(73) Assignee: FAIST COMPONENTI S.P.A., Montone (IT)

( * ) Notice: Subject to any disclaimer, the term of this patent is extended or adjusted under 35 U.S.C. 154(b) by 367 days.

(21) Appl. No.: 14/698,063

(22) Filed: Apr. 28, 2015

(65) Prior Publication Data

US 2015/0316393 A1  Nov. 5, 2015

(30) Foreign Application Priority Data

Apr. 30, 2014  (IT) .............................. VR2014A0109

(51) Int. Cl.
*G01D 5/14* (2006.01)
*F15B 15/28* (2006.01)
(Continued)

(52) U.S. Cl.
CPC ......... *F15B 15/2861* (2013.01); *G01D 5/145* (2013.01); *G01D 11/245* (2013.01);
(Continued)

(58) Field of Classification Search
CPC ......... B23P 11/00; G01D 5/142; G01D 5/145; G01D 5/147; G01D 11/245; H01R 43/005; Y10T 29/49119
See application file for complete search history.

(56) References Cited

U.S. PATENT DOCUMENTS 5,499,440 A * 3/1996 Satoh ..................... B21K 25/00
29/512
6,639,398 B2  10/2003 Genot et al.
(Continued)

FOREIGN PATENT DOCUMENTS

| EP | 2657651 A2 | 10/2013 |
| IT | 1354723 | 5/2006 |
| IT | 1393598 | 3/2009 |

*Primary Examiner* — Logan Kraft
(74) *Attorney, Agent, or Firm* — Pearne & Gordon LLP (57) ABSTRACT

A method for making a detection device (2) for detecting a position of a movable rod (4) of a pneumatic actuator (1) comprises a step of taking a first body (17) comprising a connecting portion (19), a supporting portion (20), an electrical connector (21), a detection sensor (15) for detecting a magnetic field and electrical connecting means (22). The method then comprises a step of taking a second body (18) comprising a housing (14) in which the supporting portion (20) can be inserted, a step of inserting the supporting portion (20) and the detection sensor (15) positioned on it in the housing (14) and a step of irremovably constraining the first body (17) to the second body (18). The first body (17) and the second body (18) comprise, one at least one projecting element (25) and the other at least one corresponding hole (26); during the insertion step the projecting element (25) is inserted in the hole (26). During the constraining step the first body (17) is irremovably constrained to the second body (18) by plastically deforming the projecting element (25) to prevent it from being extracted from the hole (26) in which it is inserted.

15 Claims, 7 Drawing Sheets

(51) Int. Cl.
    *H01R 43/00*       (2006.01)
    *G01D 11/24*       (2006.01)
    *B23P 11/00*       (2006.01)

(52) U.S. Cl.
    CPC ............ *H01R 43/005* (2013.01); *B23P 11/00* (2013.01); *G01D 5/147* (2013.01); *Y10T 29/49119* (2015.01)

(56) References Cited

U.S. PATENT DOCUMENTS

| | | |
|---|---|---|
| 7,242,180 B1 | 7/2007 | O'Connor |
| 8,070,458 B2 * | 12/2011 | Meza .................... F04B 43/026 417/44.2 |
| 8,395,374 B2 * | 3/2013 | Newman ................ G01D 5/145 324/207.24 |
| 8,997,629 B2 | 4/2015 | Natali |
| 2009/0268414 A1 * | 10/2009 | Lu ..................... B29C 45/14639 361/736 |
| 2011/0030369 A1 | 2/2011 | Natali |
| 2013/0285649 A1 | 10/2013 | van der Kuij et al. |

* cited by examiner

METHOD FOR MAKING A DETECTION DEVICE FOR DETECTING THE POSITION OF A MOVABLE ROD OF A PNEUMATIC ACTUATOR AND DETECTION DEVICE OBTAINABLE WITH THAT METHOD

CROSS-REFERENCE TO RELATED APPLICATIONS

The present application claims the benefit of Italian Patent Application No. VR2014A000109 filed on Apr. 30, 2014, which is incorporated herein by reference in its entirety.

DESCRIPTION

This invention relates to a method for making a detection device for detecting the position of the movable rod of a pneumatic actuator and a detection device obtainable in that way.

This invention is intended, in particular, for pneumatic actuators used in internal combustion engines of vehicles and even more particularly for controlling the turbines of turbo-compressors.

Therefore, hereinafter reference will be made to that family of actuators, although this invention may in any case also apply to actuators intended for other uses.

In general, pneumatic actuators are devices which have a containment structure the inside of which forms a chamber divided into two further chambers by a flexible diaphragm mounted in a fluid-tight fashion. Attached to the diaphragm there is a first end of a movable rod which extends through the containment structure and which has a second end which in use is connected to the device to be controlled (such as the turbo-compressor).

At least one of the two chambers formed by the diaphragm in the pneumatic actuator, as well as being a chamber whose volume is variable depending on the shape adopted by the diaphragm, is made in such a way that it is fluid-tight and is connected to a duct through which it is possible to vary its internal pressure (by generating an overpressure or vacuum using an external source).

Fixed to the diaphragm and to the movable rod there is a coupling cup and interposed between the coupling cup and the containment structure there is a spring designed to oppose the variations in the volume of the above-mentioned variable-volume chamber (in the most widespread solutions in which a vacuum is used, the spring tends to keep the chamber at its maximum volume).

The combined action of the pressure variation and the spring can therefore cause a controlled movement of both the diaphragm and, consequently, the end of the movable rod fixed to it.

To be able to control the position of the movable rod in use, the pneumatic actuators are also provided with suitable detection means which may have different forms, depending on requirements.

One example of such detection means is described in Italian patent No. 1354723. In this case the detection means are constituted of a rheostat whose stationary part is fixed to the containment structure and whose slider is in contrast fixed to a movable part fixed to the diaphragm and to the movable rod. Therefore, to determine the position of the movable rod it is sufficient to measure the instantaneous resistance of the rheostat, since each movement of the diaphragm corresponds to a movement of the rheostat slider.

It should also be noticed that there are also prior art detection means based on detection of a magnetic field. Said detection means are usually constituted of a magnet fixed to the movable rod and of a device for detecting the magnetic field comprising for example a Hall effect sensor which is fixed to the pneumatic actuator containment structure. Movement of the magnet relative to the detection sensor varies the intensity of the magnetic field present at the sensor and so allows the position of the movable element to be determined based on what the sensor detected.

Examples of such a type of detection means are described in U.S. Pat. No. 6,639,398 and in Italian patent No. 1393598.

Amongst magnetic field detection devices there is a sub-family of detection devices (an example of such a type of detection devices is described in U.S. Pat. No. 8,395,374) comprising a connecting portion with which an electrical connector is associated, in use allowing the detection device to be electrically connected to a control unit, a housing containing a detection sensor and a flange which allows the detection device to be connected to the containment structure. The housing is made in an elongate part which penetrates inside the containment structure of the pneumatic actuator, but the detection sensor is kept not in fluid communication with the chamber in the containment structure. A movable element comprising a magnet and fixed to the movable rod is positioned inside the containment structure in a position adjacent to the elongate part in which the housing containing the detection sensor is made. In this way, the detection sensor detects various magnetic field values due to the variation in the position of the magnet, which in turn is due to the variations in the position of the movable rod.

Such detection devices are structurally constituted of two bodies, one of which is partly inserted in the other and which are irremovably joined together. The first body comprises the connecting portion with which the electrical connector is associated and a supporting portion on which the magnetic field detection sensor is positioned. In contrast, the second body comprises the elongate part forming the housing and the flange connecting the detection device to the containment structure. In other prior art solutions, in contrast the second body forms a single body with a part of the containment structure.

In the prior art technology, the first body and the second body are joined by inserting the supporting portion in the housing and rendering them irremovable relative to one another by ultrasonic welding or by gluing.

This invention relates to a method for making a detection device for detecting a magnetic field of the sub-family described above and aims to overcome the fact that the prior art technology has several disadvantages.

First, the prior art method for making such detection devices comprises, as already indicated, inserting the first body in the second body and rendering them irremovable relative to each other by ultrasonic welding. Consequently, in order to be able to implement that method, a high degree of precision is required to ensure that the two bodies are both correctly positioned during the welding step and there are no changes in the relative positions during the welding step. Even use of the gluing method for fixing the first body to the second body requires a high level of precision to ensure that the layer of fixing material (glue) used is suitable, since a layer of fixing material that is too much or too little may result in unwanted disadvantages (or problems with fixing).

Second, welding or gluing are also used with the aim of sealing in a fluid-tight fashion the portion of housing containing the detection sensor, in order to protect the sensor from substances which could damage it. Therefore, to achieve that aim, the welding or gluing must be carried out extremely precisely. In fact, if the weld or gluing has imperfections even just at some points, then substances hazardous for the sensor may infiltrate the housing. Consequently, the use of welding or gluing as method for sealing the housing containing the sensor is relatively difficult at the application stage and involves high costs.

In this context, the technical purpose which forms the basis of this invention is to provide a method for making a detection device for detecting the position of a movable rod of a pneumatic actuator which overcomes the above-mentioned disadvantages.

In particular, the technical purpose of this invention is to provide a method for making a detection device for detecting the position of a movable rod of a pneumatic actuator which is easier to make than with the methods known until now.

It is also the technical purpose of this invention to provide a method for making a detection device for detecting the position of a movable rod of a pneumatic actuator which allows optimum protection of the detection sensor. The technical purpose specified and the aims indicated are substantially achieved by a method for making a detection device for detecting the position of a movable rod of a pneumatic actuator, and a detection device obtainable in that way, as described in the appended claims.

Further features and the advantages of this invention are more apparent in the detailed description of a preferred, non-limiting embodiment of a method for making a detection device for detecting the position of a movable rod of a pneumatic actuator and a detection device obtainable in that way, illustrated in the accompanying drawings, in which.

With reference to the above-mentioned figures the numeral 1 denotes in its entirety a pneumatic actuator on which a detection device obtainable with the method according to this invention is mounted and the numeral 2 denotes the detection device.

Figure 1:
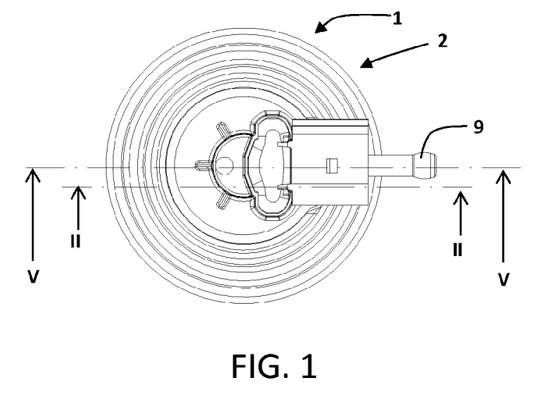
FIG. 1 is a top view of a pneumatic actuator comprising a detection device made in accordance with this invention.
Figure 2:
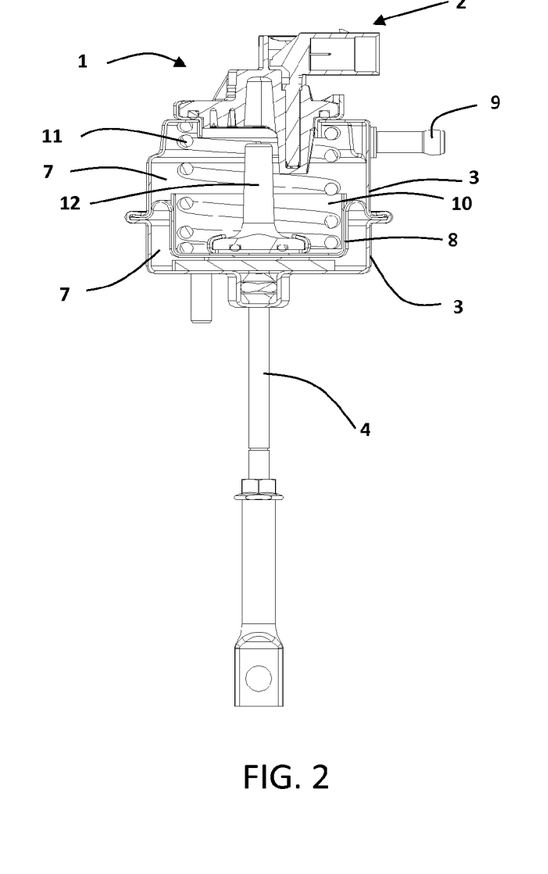
FIG. 2 is a cross-sectional view of the pneumatic actuator of FIG. 1 according to section line II-II of FIG. 1.
Figure 3:
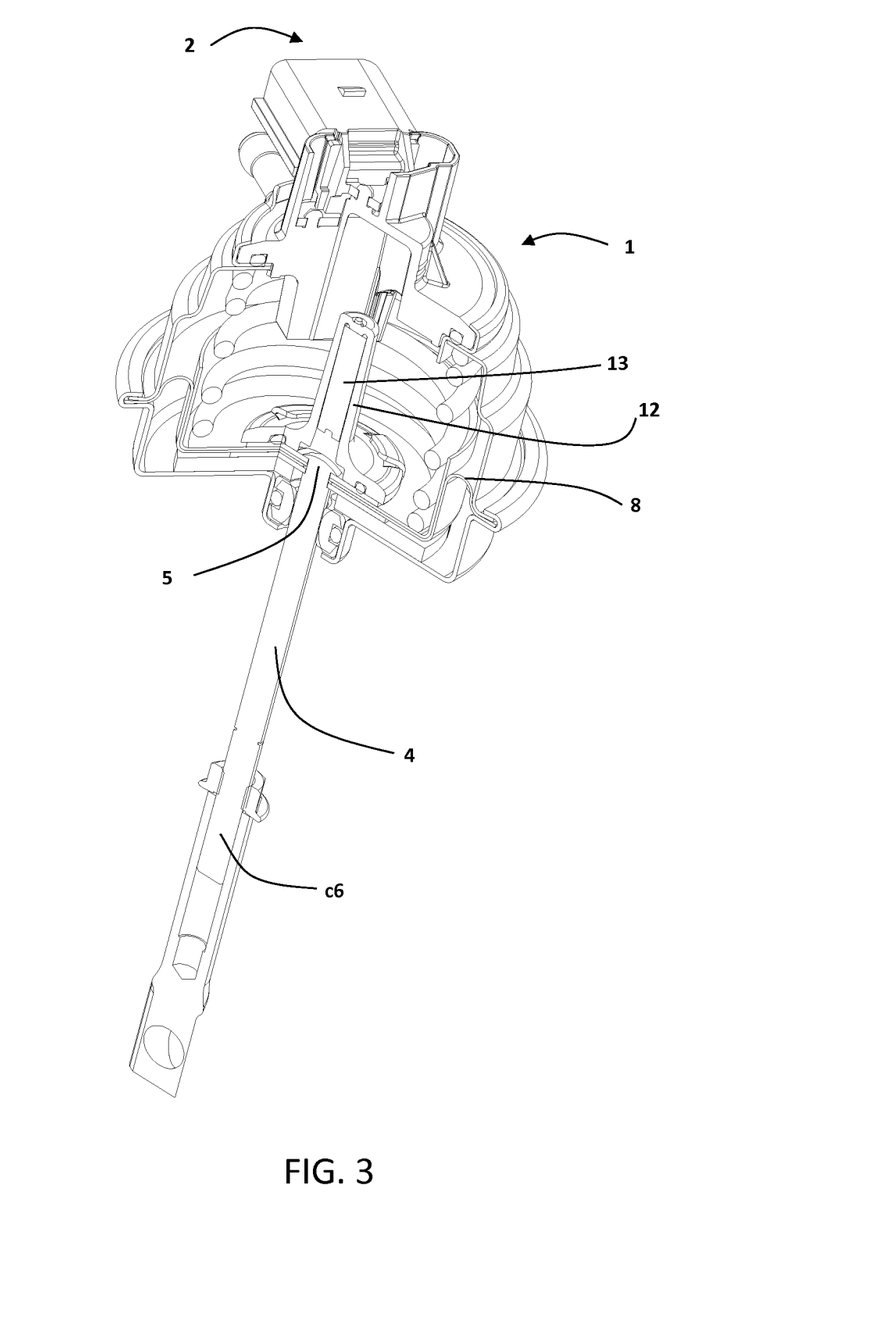
FIG. 3 is an axonometric view partly in cross-section of the pneumatic actuator of FIG. 1 without a polymeric filling material.
Figure 4:
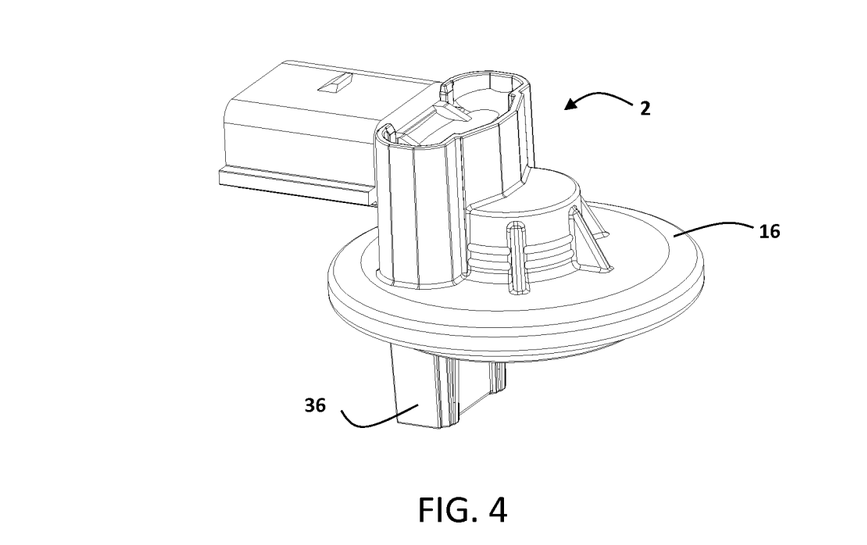
FIG. 4 is an axonometric view of the detection device of FIG. 1.

With reference to FIGS. 1 to 3, before describing the method for making a detection device 2 for detecting the position of the movable rod of a pneumatic actuator 1 according to this invention, the pneumatic actuator 1, on which the detection device 2 obtainable with that method is mounted, is briefly described.

In general, the pneumatic actuator 1 comprises a containment structure 3, to which a detection device 2 is connected, and a movable rod 4 extending with a first end 5 through the containment structure 3 and comprising a second end 6, outside the containment structure 3, which in use is connectable to a device to be controlled (such as a turbine of a turbo-compressor).

The inside of the containment structure 3 forms a main chamber divided into two secondary chambers 7 by a flexible diaphragm 8 mounted in a fluid-tight fashion (advantageously a rolling diaphragm). The secondary chambers 7 are variable volume chambers, since the volume varies depending on the shape adopted by the diaphragm 8. At least one of the two secondary chambers 7 is also made in such a way that it is fluid-tight and is connected to a duct 9 through which it is possible to vary its internal pressure.

Fixed to the diaphragm 8 there is a coupling cup 10 and interposed between the coupling cup 10 and the containment structure 3 there is a spring 11 designed to oppose the variations in the volume of the secondary chambers 7. The first end 5 of the movable rod 4 is fixed to the diaphragm 8 and to the coupling cup 10.

The combined action of the pressure variation and the spring 11 may therefore cause a controlled movement of both the diaphragm 8 and, consequently, the first end 5 of the movable rod 4 fixed to it.

Securely connected to the diaphragm 8 and to the first end 5 of the movable rod 4 there is a movable element 12 coaxial with the movable rod 4, comprising a magnet 13 and extending inside the containment structure 3.

The detection device 2 comprises an elongate part 36, forming a housing 14 containing a magnetic field detection sensor 15, and a flange 16 which allows the detection device 2 to be connected to the containment structure 3. Alternatively, in an embodiment not illustrated, the detection device 2 may also form a single body with a part of the containment structure 3. The elongate part 36 of the detection device 2 forming the housing 14, in turn containing the detection sensor 15, penetrates inside the containment structure 3, but keeps the detection sensor 15 not in fluid communication with the main chamber.

The movable element 12 is positioned alongside the elongate part 36 to allow the detection sensor 15 to detect the magnetic field generated by the magnet 13.

To illustrate the subject matter of this invention, the method for making the detection device 2 for detecting the movable rod 4 of the pneumatic actuator 1 is described below.

The above-mentioned method comprises first a step of taking a first body 17 and a second body 18.

Figure 6:
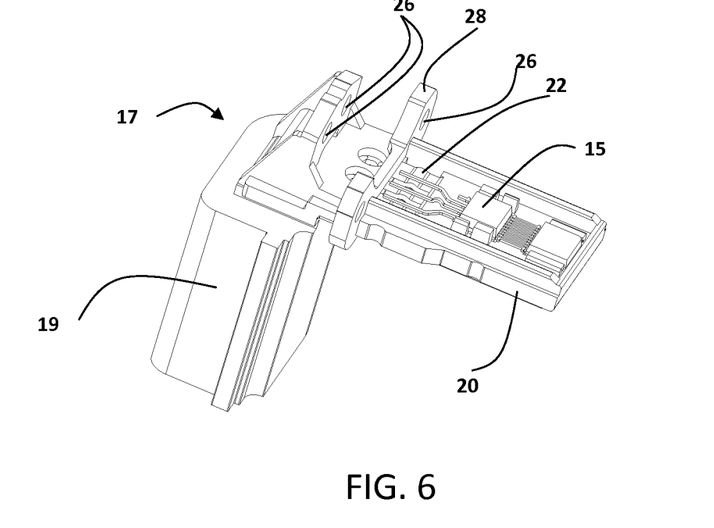
FIG. 6 is an axonometric view of a first body of the detection device of FIG. 4.
Figure 7:
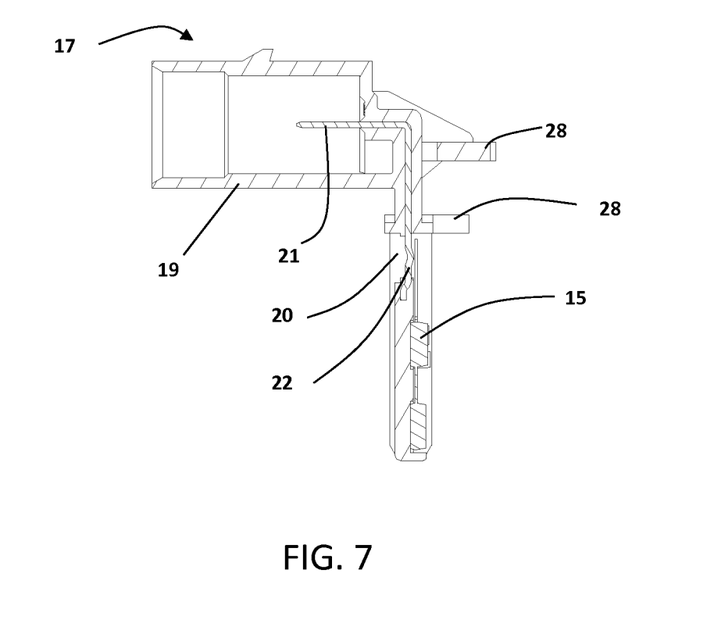
FIG. 7 is a cross-sectional view of the first body of FIG. 6 according to section line V-V of FIG. 1.

The first body 17 comprises a connecting portion 19, a supporting portion 20 connected to the connecting portion 19, an electrical connector 21 associated with the connecting portion 19 and which, when the detection device 2 is in use, allows it to be electrically connected to a control unit external to the actuator, the detection sensor 15 positioned on the supporting portion 20 and electrical connecting means 22 for electrically connecting the electrical connector 21 to the detection sensor 15.

Figure 8:
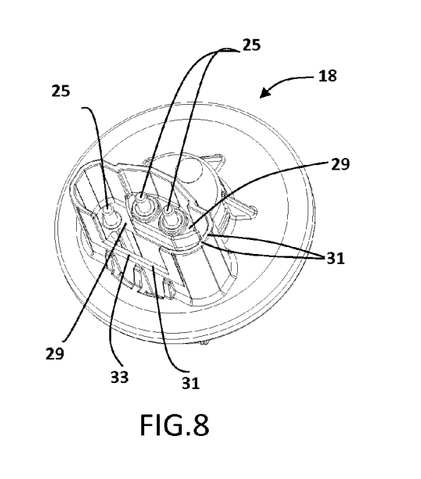
FIG. 8 is an axonometric view of a second body of the detection device of FIG. 4.
Figure 9:
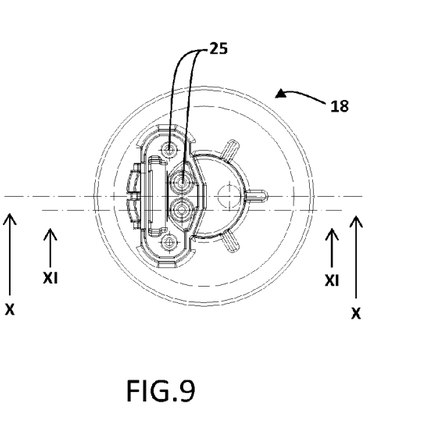
FIG. 9 is a top view of the second body of FIG. 8.
Figure 10:
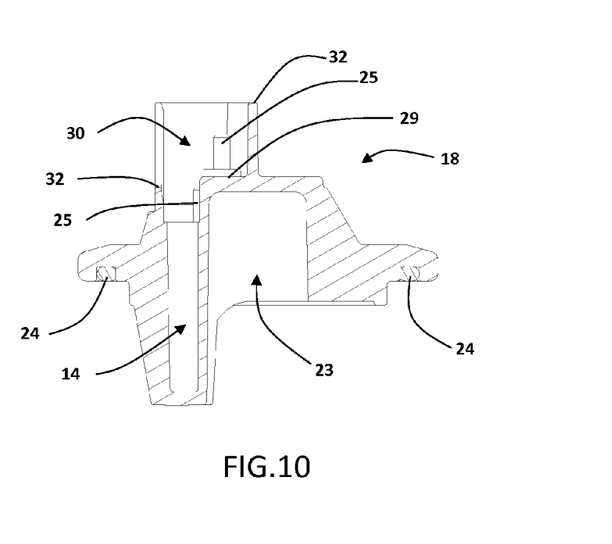
FIG. 10 is a cross-sectional view of the second body of FIG. 9 according to section line X-X.

The second body 18 comprises a housing 14 in which the supporting portion 20 of the first body 17 can be inserted.

In the embodiment illustrated in the accompanying figures, the connecting portion 19 and the supporting portion 20 of the first body 17 are connected to each other and extend respectively along two main lines which form a right angle. However, depending on requirements, the connecting portion 19 and the supporting portion 20 may be connected in various positions relative to one another.

In a preferred embodiment, the connecting portion 19 has a hollow shape and contains the electrical connector 21 in the cavity. In this case, in order to connect the detection device 2 to the control unit in use, the connecting portion 19 acts as a socket in which it is possible to insert a plug to which a cable is connected.

Advantageously, the detection sensor 15 may be, for example, a Hall effect sensor.

Moreover, in the embodiment illustrated, the second body 18 comprises the flange 16, which in use allows the detection device 2 to be connected to the containment structure 3 of the pneumatic actuator 1, and the elongate part 36 in which the housing 14 containing the detection sensor 15 is made. Alternatively, as already indicated, in an embodiment not illustrated, the second body 18 may form a single body with a part of the containment structure 3. In the embodiment illustrated in the accompanying figures, the housing 14 has a main line of extension substantially perpendicular to the main plane of extension of the flange 16. Consequently, the second body 18 leaves free a portion of space 23 adjacent to the housing 14 in which, when the detection device 2 is connected to the containment structure 3, the movable element 12 comprising the magnet 13 is positioned. Moreover, the second body 18 may be provided with an O-ring 24 which guarantees fluid-tightness in the connection of the detection device 2 to the containment structure 3.

According to the method for making the detection device 2, according to this invention, the first body 17 and the second body 18 comprise, one at least one projecting element 25 and the other at least one corresponding hole 26 in which the projecting element 25 can be inserted.

The projecting element 25 may have a cylindrical shape, as shown in the accompanying figures, or any other shape which allows insertion in the corresponding hole 26.

The hole 26 may be shaped to match the projecting element 25, or it may have any other shape which allows the corresponding projecting element 25 to be inserted in it, as well as having a constant or variable cross-section.

In a preferred embodiment of this invention, the first body 17 and the second body 18 comprise a plurality of pairs made up of projecting elements 25 and corresponding holes 26, in such a way that the projecting element 25 and the hole 26 of each pair are part, one of the first body 17 and the other of the second body 18. For example, in the embodiment illustrated in the accompanying figures, the first body 17 and the second body 18 comprise four pairs made up of projecting elements 25 and corresponding holes 26. In particular, the four projecting elements 25 are part of the second body 18 and the four corresponding holes 26 are part of the first body 17.

Figure 11:
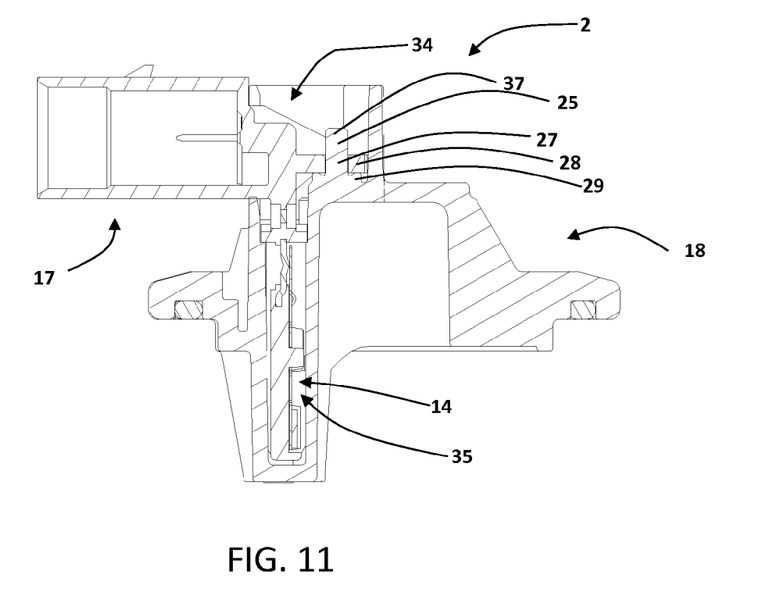
FIG. 11 is a cross-sectional view of the first body and of the second body at the end of an insertion step in accordance with this invention, according to section line XI-XI of FIG. 9.

The method according to this invention then comprises a step of inserting the supporting portion 20, and the detection sensor 15 positioned on it, into the housing 14 of the second body 18. That insertion step may be performed by sliding the supporting portion 20 into the housing 14 until it reaches a position in which it is in contact inside the housing 14, as shown in FIG. 11. In a preferred embodiment of this invention, the insertion step is also performed by inserting the supporting portion 20 of the first body 17 in the housing 14 of the second body 18 along a line of insertion, advantageously parallel to the main line of extension of the housing.

Moreover, in the method according to this invention, during the insertion step each projecting element 25 is inserted into the corresponding hole 26. Therefore, at the end of insertion, for each pair made up of a projecting element 25 and a hole 26 there is a coupling portion 27 of the projecting element 25 inserted in the hole 26.

In one embodiment, where there are at least two pairs made up of a projecting element 25 and a hole 26, at the end of insertion each projecting element 25 comprises a coupling portion 27 inserted in the corresponding hole 26 which is at least partly in a different position along the line of insertion relative to the coupling portion 27 of at least one projecting element 25 of another pair. In other words, the coupling portion of one projecting element 25 is at a different height, relative to a bottom of the housing 14, compared with the coupling portion 27 of at least one other projecting element 25.

However, advantageously, when there is a plurality of pairs made up of a projecting element 25 and a hole 26, once the insertion step is complete at least two projecting elements 25 have the coupling portion 27 substantially in the same position along the line of insertion. For example, in the embodiment illustrated in the accompanying figures, once the insertion step is complete, the projecting elements 25 in couples have the coupling portion 27 substantially in the same position along the line of insertion. In particular, in the embodiment illustrated in the accompanying figures, the first body 17 comprises along the supporting portion 20 two first brackets 28 projecting along a line perpendicular to the line of insertion, and located in different positions along the line of insertion. Moreover, two holes 26 are made in each first bracket 28. In contrast, the second body 18 comprises inside the housing 14 two second contact brackets 29 extending along a line perpendicular to the line of insertion and located in different positions along the line of insertion. Moreover, there are two projecting elements 25 on each second bracket 29. In this way, advantageously, once the insertion step is complete, the two first brackets 28 rest on the respective two second brackets 29 and, in couples, the pairs made up of a projecting element 25 and a hole 26 are in the same position along the line of insertion.

Moreover, in the preferred embodiment the housing 14 comprises a mouth 30 through which the supporting portion 20 is inserted in the housing 14 during the insertion step. Said mouth 30 is delimited by an edge 31 having a first portion 32 substantially coplanar with a plane perpendicular to the line of insertion and a second portion 33 which forms a recess relative to the first portion 32. As shown in the accompanying figures, once the insertion step is complete, the connecting portion 19 is inserted in the recess outlined by the second portion 33 of the edge 31 and the main axis of extension of the connecting portion 19 substantially forms a right angle with the line of insertion. Moreover, the first body 17 is shaped in such a way that, once the insertion step is complete, near to the mouth 30 there is an empty space 34 delimited by the first body 17 and by the second body 18. Advantageously, the empty space 34 extends inside the housing 14 only as far as the first bracket 28 inserted the furthest into the housing 14. Therefore, once the insertion step is complete, it is possible to identify in the housing 14 the empty space 34 near to the mouth 30 and an inner chamber 35 in which the detection sensor 15 is present.

In the most simple embodiment, as illustrated in the accompanying figures, once the insertion step is complete each projecting element 25 comprises an end portion 37 projecting from the corresponding hole 26. Alternatively, in an embodiment not illustrated, once the insertion step is complete one or more of the projecting elements 25 present may comprise an end portion 37 which does not project from the corresponding hole 26.

Figure 12:
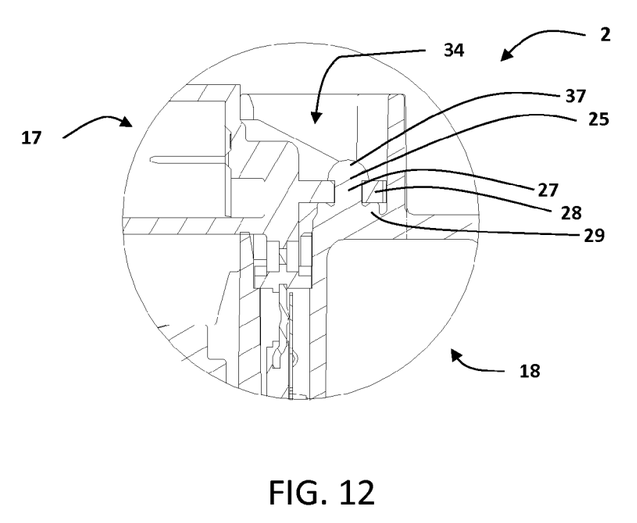
FIG. 12 shows a detail of FIG. 11 at the end of a subsequent constraining step.

The method according to this invention comprises, after the insertion step, a constraining step for irremovably constraining the first body 17 to the second body 18 by means of plastic deformation of each projecting element 25 to prevent it from being extracted from the hole 26 in which it is inserted. In the preferred embodiment illustrated in the accompanying figures, in which at the end of the insertion step the projecting element 25 comprises an end portion 37 which projects from the corresponding hole 26, the constraining step occurs by plastically deforming the end portion 37 by riveting (clinching), usually performed hot.

Alternatively, in an embodiment not shown in the accompanying figures, in which after the insertion step the projecting element 25 does not comprise an end portion 37 projecting from the corresponding hole 26, the constraining step may be carried out by plastically deforming the projecting element 25 inside the hole 26 to prevent it from being extracted from the hole 26. This is advantageous, for example, if the hole 26 has a flared shape with a cross-section that is larger towards the end portion 37 of the projecting element 25.

Once the constraining step is complete, the method according to this invention preferably comprises a step of fluid-tight sealing of the housing 14, thereby guaranteeing optimum protection for the detection sensor 15 positioned in the housing 14. Advantageously, the sealing step is carried out by at least partly filling the housing 14 with a polymeric material 38 in the liquid state or in the form of a gel. The polymeric material 38 is then made to or allowed to solidify. In this way, once the polymeric material 38 has solidified, there is also guaranteed optimum mechanical stability of the detection device 2 which was originally constituted of two separate bodies. Advantageously, said polymeric material 38 may be a resin, preferably a polyurethane resin.

Figure 5:
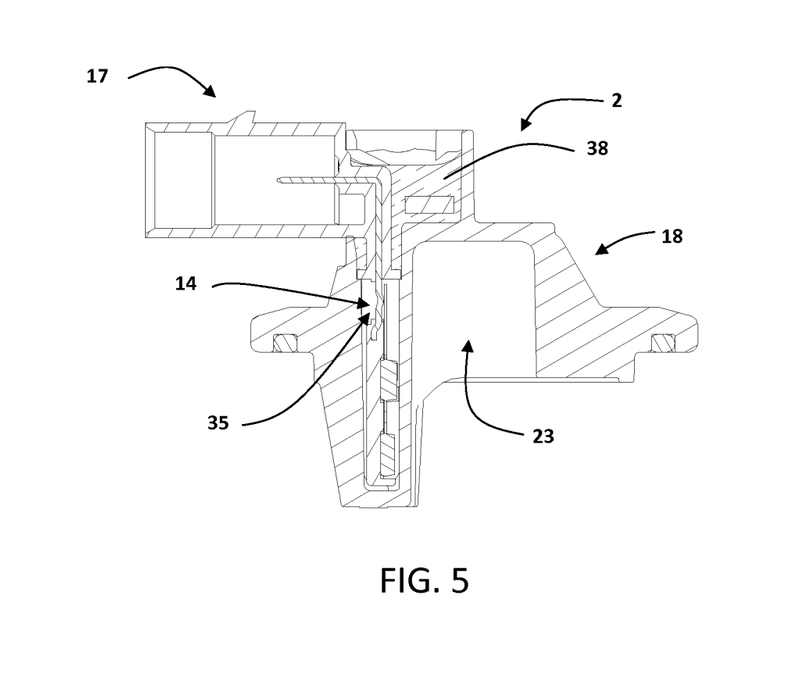
FIG. 5 is a cross-sectional view of the detection device of FIG. 4 according to section line V-V of FIG. 1.

In the preferred embodiment, illustrated in the accompanying figures, the sealing step is carried out by filling the empty space 34 delimited by the first body 17 and by the second body 18 at the mouth 30 of the housing 14 through which the supporting portion 20 is inserted in the housing 14 during the insertion step.

Advantageously, once the sealing step is complete, the polymeric material 38 at least partly encompasses the at least one plastically deformed projecting element 25. In particular, in the preferred embodiment illustrated in the accompanying figures, once the sealing step is complete, the polymeric material 38 encompasses the deformed end portions 37 of each projecting element 25.

Figure 13:
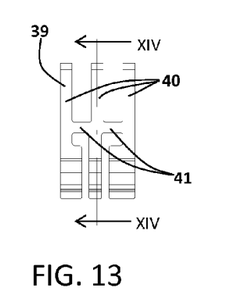
FIG. 13 is a front view of a metal shaped element of the first body of FIG. 6.
Figure 14:
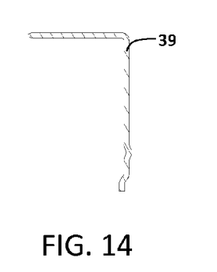
FIG. 14 is a cross-sectional view of the metal shaped element according to section line XIV-XIV of FIG. 13.
Figure 15:
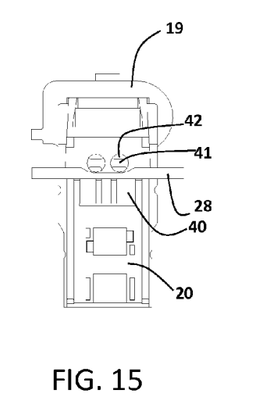
FIG. 15 is a front view of the metal shaped element of FIG. 13 after a step of overmolding with a plastic material.

In the preferred embodiment of the method according to this invention, the step of taking the first body 17 is preceded by a step of making the first body 17. The step of making the first body comprises first a step of taking a metal shaped element 39 formed by at least two elongate parts 40 which are connected to one another. The metal shaped element 39 is made of a material with high electric conductivity (for example copper or aluminum) and advantageously obtained by cutting/bending from a flat sheet. The step of making the first body then comprises a step of overmolding the metal shaped element 39 with a plastic material, forming at least the connecting portion 19, the supporting portion 20 connected to the connecting portion 19 and each projecting element 25 and/or hole 26 which is present. In the embodiment illustrated in the accompanying figures, the metal shaped element 39 is formed of three L-shaped elongate parts 40, positioned side by side and joined to one another by two metal portions 41. In the overmolding step a single piece of plastic material is produced and defines the connecting portion 19, the supporting portion 20, the first brackets 28 and the holes 26. That single piece of plastic material encompasses the metal shaped element 39.

Figure 16:
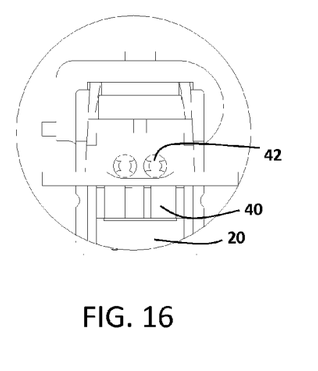
FIG. 16 shows a detail of FIG. 15 after a further processing.

The method then comprises a step of separating the at least two elongate parts 40 of the overmolded metal shaped element 39, to make them electrically independent. For that purpose, as illustrated in the accompanying figures, during the overmolding step an opening 42 is made in the supporting portion 20 at each metal portion 41 which joins the elongate parts 40, in such a way as to make said metal portions 41 visible and reachable during the subsequent step of separation of the elongate parts 40. Said separating step may in fact be carried out by cutting, by inserting a punch or another suitable tool in the opening 42.

Figure 17:
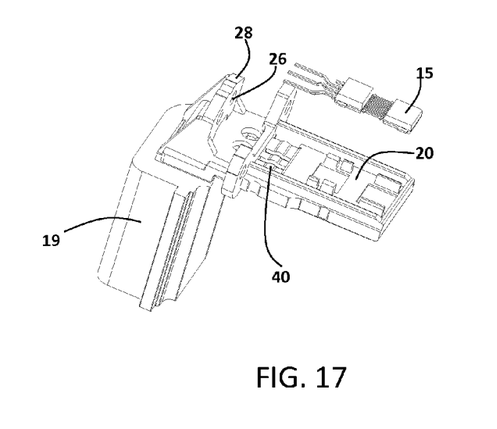
FIG. 17 is an axonometric view of a step of positioning a magnetic field detection sensor on the overmolded part shown in FIG. 15.

The step of making the first body 17 then comprises a step of taking the detection sensor 15, positioning it on the supporting portion 20 and electrically connecting it to the at least two elongate parts 40 of the metal shaped element 39. Advantageously, said connection can be made by soldering.

Consequently, the at least two elongate parts 40 constitute the electrical connector 21 and the electrical connecting means 22. In fact, once preparation of the first body 17 is complete, the first ends of the elongate parts 40 positioned in the connecting portion 19 constitute the electrical connector 21, whilst the remaining parts of the elongate parts 40 constitute the electrical connecting means 22.

However, in other embodiments in which the various parts have different shapes or dimensions, the steps just described for preparing the first body 17 may also be carried out in other ways.

Moreover, in the preferred embodiment of the method according to this invention, the step of taking the second body 18 is preceded by a step of making the second body 18. The step of making the second body 18 comprises a step of molding the second body 18 with a plastic material during which each projecting element 25 and/or hole 26 is also made. In the preferred embodiment, during the molding step the entire second body 18 is made as a single piece.

Moreover, this invention relates to the detection device 2 obtainable using the method according to this invention also as such, as well as a pneumatic actuator 1 comprising the detection device 2.

This invention brings important advantages.

In fact, the method according to this invention allows the detection device for detecting the position of a movable rod of a pneumatic actuator to be made in a way that is easier than the prior art methods, thanks to the use of projecting elements and related holes for the irremovable connection between the parts.

Moreover, in the preferred embodiment, the method according to this invention allows to obtain a detection device for detecting the position of a movable rod of a pneumatic actuator, which guarantees optimum protection of the detection sensor thanks to the fact that the housing is sealed with a polymeric material.

Finally, it should be noticed that the cost linked to implementing this invention is not very high.

The invention described above may be modified and adapted in several ways without thereby departing from the scope of the inventive concept.

Moreover, all details of the invention may be substituted with other technically equivalent elements and the materials used, as well as the shapes and dimensions of the various components, may vary according to requirements.

The invention claimed is:

1. A method for making a detection device (2) for detecting a position of a movable rod (4) of a pneumatic actuator (1), comprising the operating steps of:
taking a first body (17) comprising a connecting portion (19), a supporting portion (20) connected to the connecting portion (19), an electrical connector (21) associated with the connecting portion (19) and which in use allows electrical connection of the detection device (2) to a control unit, a magnetic field detection sensor (15) positioned on the supporting portion (20) and electrical connecting means (22) for electrically connecting the electrical connector (21) to the detection sensor (15);
taking a second body (18) comprising a housing (14) in which the supporting portion (20) can be inserted;
inserting the supporting portion (20) and the detection sensor (15) positioned on the supporting portion (20) into the housing (14);
irremovably constraining the first body (17) to the second body (18);
wherein the first body (17) and the second body (18) comprise a plurality of pairs of projecting elements (25) and of corresponding holes (26) in which the projecting elements (25) can be inserted, the projecting element (25) and the hole (26) of each pair being part, one of the first body (17) and the other of the second body (18),
wherein during the insertion step each projecting element (25) is inserted in the corresponding hole (26),
wherein during the constraining step the first body (17) is irremovably constrained to the second body (18) by plastically deforming each projecting element (25) to prevent each projecting element (25) from being extracted from the corresponding hole (26) in which said projecting element (25) is inserted,
wherein the insertion step occurs by inserting the supporting portion (20) into the housing (14) along a line of insertion, wherein for each pair of projecting element (25) and hole (26) there is a coupling portion (27) of the projecting element (25) inserted in the hole (26), and
wherein at the end of insertion each projecting element (25) has a coupling portion (27) which is at least partly in a different position along the line of insertion relative to the coupling portion (27) of at least one projecting element (25) of another pair.

2. The method according to claim 1, wherein, once the insertion step is complete, at least two projecting elements (25) have the coupling portion (27) substantially in the same position along the line of insertion.

3. The method according to claim 1, wherein, once the insertion step is complete, each projecting element (25) comprises an end portion (37) projecting from the corresponding hole (26).

4. The method according to claim 3, wherein, during the constraining step, the end portion (37) of each projecting element (25) is plastically deformed by riveting.

5. A method for making a detection device (2) for detecting a position of a movable rod (4) of a pneumatic actuator (1), comprising the operating steps of:
taking a first body (17) comprising a connecting portion (19), a supporting portion (20) connected to the connecting portion (19), an electrical connector (21) associated with the connecting portion (19) and which in use allows electrical connection of the detection device (2) to a control unit, a magnetic field detection sensor (15) positioned on the supporting portion (20) and electrical connecting means (22) for electrically connecting the electrical connector (21) to the detection sensor (15);
taking a second body (18) comprising a housing (14) in which the supporting portion (20) can be inserted;
inserting the supporting portion (20) and the detection sensor (15) positioned on the supporting portion (20) into the housing (14);
irremovably constraining the first body (17) to the second body (18);
wherein the first body (17) and the second body (18) comprise, one at least one projecting element (25) and the other at least one corresponding hole (26) in which the projecting element (25) can be inserted,
wherein during the insertion step the projecting element (25) is inserted in the hole (26), and
wherein during the constraining step the first body (17) is irremovably constrained to the second body (18) by plastically deforming the projecting element (25) to prevent the projecting element (25) from being extracted from the hole (26) in which the projecting element (25) is inserted,
wherein, after the constraining step, a step of fluid-tight sealing of the housing (14) of the second body (18) is carried out.

6. The method according to claim 5, wherein the sealing step is carried out by at least partly filling the housing (14) with a polymeric material (38).

7. The method according to claim 6, wherein the sealing step is carried out by filling an empty space (34) delimited by the first body (17) and by the second body (18) at a mouth (30) of the housing (14) through which the supporting portion (20) is inserted in the housing (14) during the insertion step.

8. The method according to claim 6, wherein, once the sealing step is complete, the polymeric material (38) at least partly encompasses the at least one plastically deformed projecting element (25).

9. A method for making a detection device (2) for detecting a position of a movable rod (4) of a pneumatic actuator (1), comprising the operating steps of:
taking a first body (17) comprising a connecting portion (19), a supporting portion (20) connected to the connecting portion (19), an electrical connector (21) associated with the connecting portion (19) and which in use allows electrical connection of the detection device (2) to a control unit, a magnetic field detection sensor (15) positioned on the supporting portion (20) and electrical connecting means (22) for electrically connecting the electrical connector (21) to the detection sensor (15);
taking a second body (18) comprising a housing (14) in which the supporting portion (20) can be inserted;
inserting the supporting portion (20) and the detection sensor (15) positioned on the supporting portion (20) into the housing (14);
irremovably constraining the first body (17) to the second body (18);

wherein the first body (17) and the second body (18) comprise, one at least one projecting element (25) and the other at least one corresponding hole (26) in which the projecting element (25) can be inserted, wherein during the insertion step the projecting element (25) is inserted in the hole (26), and wherein during the constraining step the first body (17) is irremovably constrained to the second body (18) by plastically deforming the projecting element (25) to prevent the projecting element (25) from being extracted from the hole (26) in which the projecting element (25) is inserted, wherein the step of taking the first body (17) is preceded by a step of making the first body (17) which in turn comprises the steps of:
- taking a metal shaped element (39) formed by at least two elongate parts (40) which are connected to one another,
- overmolding the metal shaped element (39) with a plastic material, forming at least the connecting portion (19), the supporting portion (20) connected to the connecting portion (19) and the at least one projecting element (25) and/or hole (26),
- separating the at least two elongate parts (40) of the overmolded metal shaped element (39),
- taking the detection sensor (15), positioning the detection sensor (15) on the supporting portion (20) and electrically connecting the detection sensor (15) to the at least two elongate parts (40) of the metal shaped element (39), the at least two elongate parts (40) constituting the electrical connector (21) and the electrical connecting means (22).

10. The method according to claim 9, wherein the step of taking the second body (18) is preceded by a step of making the second body (18) which in turn comprises a step of molding the second body (18) with a plastic material during which the at least one projecting element (25) and/or hole (26) is made.

11. A detection device (2) for detecting a position of a movable rod (4) of a pneumatic actuator (1), comprising:
- a first body (17) comprising a connecting portion (19), a supporting portion (20) connected to the connecting portion (19), an electrical connector (21) associated with the connecting portion (19) and which in use allows electrical connection of the detection device (2) to a control unit, a magnetic field detection sensor (15) positioned on the supporting portion (20) and electrical connecting means (22) for electrically connecting the electrical connector (21) to the detection sensor (15);
- a second body (18) comprising a housing (14) in which the supporting portion (20) and the magnetic field detection sensor (15) positioned on the supporting portion (20) are inserted;

wherein the first body (17) and the second body (18) comprise a plurality of pairs of projecting elements (25) and of corresponding holes (26), the projecting element (25) and the hole (26) of each pair being part, one of the first body (17) and the other of the second body (18), each projecting element (25) being inserted in the corresponding hole (26) and being plastically deformed to prevent each projecting element (25) from being extracted from the corresponding hole (26) in which said projecting element (25) is inserted, whereby the first body (17) is irremovably constrained to the second body (18);

wherein for each pair of projecting element (25) and hole (26) there is a coupling portion (27) of the projecting element (25) inserted in the hole (26); and wherein the coupling portion (27) of one projecting element (25) is at a different height, relative to the bottom of the housing (14) of the second body (18), compared with the coupling portion (27) of at least one other projecting element (25).

12. A detection device (2) according to claim 11, wherein the housing (14) of the second body (18) is at least partly filled with a polymeric material (38) that fluid-tight seals the housing (14) of the second body (18).

13. A pneumatic actuator (1) comprising a detection device (2) according to claim 11.

14. A detection device (2) for detecting a position of a movable rod (4) of a pneumatic actuator (1), comprising:
- a first body (17) comprising a connecting portion (19), a supporting portion (20) connected to the connecting portion (19), an electrical connector (21) associated with the connecting portion (19) and which in use allows electrical connection of the detection device (2) to a control unit, a magnetic field detection sensor (15) positioned on the supporting portion (20) and electrical connecting means (22) for electrically connecting the electrical connector (21) to the detection sensor (15);
- a second body (18) comprising a housing (14) in which the supporting portion (20) and the magnetic field detection sensor (15) positioned on the supporting portion (20) are inserted;

wherein the first body (17) and the second body (18) comprise, one at least one projecting element (25) and the other at least one corresponding hole (26);

wherein the projecting element (25) is inserted in the hole (26) and is plastically deformed to prevent the projecting element (25) from being extracted from the hole (26) in which the projecting element (25) is inserted, whereby the first body (17) is irremovably constrained to the second body (18), wherein the housing (14) of the second body (18) is at least partly filled with a polymeric material (38) that fluid-tight seals the housing (14) of the second body (18), wherein the polymeric material (38) at least partly encompasses the at least one plastically-deformed projecting element (25).

15. A pneumatic actuator (1) comprising a detection device (2) according to claim 14.

* * * * *